(12) United States Patent
Huang et al.

(10) Patent No.: US 11,314,419 B2
(45) Date of Patent: Apr. 26, 2022

(54) METHOD, DEVICE AND COMPUTER PROGRAM PRODUCT FOR MANAGING DISKS

(71) Applicant: EMC IP Holding Company LLC, Hopkinton, MA (US)

(72) Inventors: Liang Huang, Shanghai (CN); Xianlong Liu, Shanghai (CN); Ruipeng Yang, Shan (CN); Xiaoliang Zhao, Roo (CN); Changyong Yu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 43 days.

(21) Appl. No.: 16/880,169

(22) Filed: May 21, 2020

(65) Prior Publication Data

US 2021/0132819 A1 May 6, 2021

(30) Foreign Application Priority Data

Oct. 30, 2019 (CN) .......................... 201911045023.3

(51) Int. Cl.
*G06F 3/06* (2006.01)
(52) U.S. Cl.
CPC .......... *G06F 3/0617* (2013.01); *G06F 3/0647* (2013.01); *G06F 3/0664* (2013.01); *G06F 3/0673* (2013.01)
(58) Field of Classification Search
None
See application file for complete search history.

(56) References Cited

U.S. PATENT DOCUMENTS

| | | | |
|---|---|---|---|
| 8,051,241 B2 * | 11/2011 | Feldman | G11C 16/349 711/103 |
| 9,128,629 B1 | 9/2015 | Mao et al. | |
| 9,135,160 B1 * | 9/2015 | Zheng | G06F 3/0679 |
| 9,436,834 B1 | 9/2016 | Tang et al. | |
| 9,594,514 B1 | 3/2017 | Bono et al. | |
| 9,684,593 B1 | 6/2017 | Chen et al. | |
| 9,798,465 B1 | 10/2017 | Labaj et al. | |
| 9,916,090 B1 | 3/2018 | Can et al. | |
| 10,013,196 B2 | 7/2018 | Tylik et al. | |
| 10,120,575 B2 | 11/2018 | Shen et al. | |
| 10,318,163 B2 | 6/2019 | Dalmatov | |
| 10,324,633 B2 | 6/2019 | Dalmatov | |
| 10,338,825 B2 | 7/2019 | Dalmatov | |
| 10,466,901 B1 | 11/2019 | Labaj et al. | |

(Continued)

*Primary Examiner* — Tracy C Chan
(74) *Attorney, Agent, or Firm* — BainwoodHuang

(57) ABSTRACT

Techniques for managing disks involve: determining a current usage parameter associated with each of a plurality of disk sets, the current usage parameter indicating usage associated with a capability of each of the plurality of disk sets, and the capability comprising at least one of the following: a number of permitted accesses per time unit and a number of permitted writes per time unit; imbalance degree associated with the plurality of disk sets, the first imbalance degree indicating a difference in the current usage parameters of the plurality of disk sets; and causing data in at least one disk slice of a first disk set to be moved to a second disk set of the plurality of disk sets, so as to lower down the first imbalance degree. In this way, a better balance can be achieved among performances of respective disks after adjustment.

20 Claims, 5 Drawing Sheets

(56) References Cited

U.S. PATENT DOCUMENTS

| | | | |
|---|---|---|---|
| 10,754,573 B2 | 8/2020 | Dalmatov et al. | |
| 11,144,222 B2 | 10/2021 | Dalmatov et al. | |
| 2012/0117351 A1* | 5/2012 | Motwani | H04L 63/0823 |
| | | | 711/165 |
| 2014/0089565 A1* | 3/2014 | Lee | G06F 3/0688 |
| | | | 711/103 |
| 2018/0097874 A1* | 4/2018 | Sampathkumar | H04L 43/0817 |
| 2018/0267705 A1* | 9/2018 | Liu | G06F 3/0655 |
| 2018/0300164 A1* | 10/2018 | B S | G06F 9/5077 |
| 2019/0253490 A1* | 8/2019 | Du | H04L 67/1029 |
| 2020/0026780 A1* | 1/2020 | Wozniak | G06F 16/1744 |
| 2020/0034075 A1* | 1/2020 | Li | G06F 3/0625 |
| 2020/0097187 A1* | 3/2020 | Lai | G06F 3/0616 |
| 2020/0110544 A1* | 4/2020 | Zhu | G06F 3/0647 |

\* cited by examiner

METHOD, DEVICE AND COMPUTER PROGRAM PRODUCT FOR MANAGING DISKS

CROSS-REFERENCE TO RELATED APPLICATION

This application claims priority to Chinese Patent Application No. CN201911045023.3, on file at the China National Intellectual Property Administration (CNIPA), having a filing date of Oct. 30, 2019, and having "METHOD, DEVICE AND COMPUTER PROGRAM PRODUCT FOR MANAGING DISKS" as a title, the contents and teachings of which are herein incorporated by reference in their entirety.

FIELD

Embodiments of the present disclosure generally relate to the field of data storage, and more specifically, to a method for disk management, an electronic device and a computer program product.

BACKGROUND

The Fully Automated Storage Tiering for Virtual Pools (FAST VP) technology is used to automatically classify different types of data into different types of storage media in a tiered pool. In order to carry out the FAST VP, for example, data which are frequently accessed or important data may be moved to a high-performance disk incurring high costs with a faster speed correspondingly, while data which are less accessed or unimportant data may be transferred to a slow low-performance disk having low costs. The FAST VP can reduce a Total Cost of Ownership (TCO) of products while improving the performance. However, a traditional FAST VP technology often fails to take into consideration a performance difference among different disks, for example, in terms of heat, worn-out level or the like, in a data movement process.

SUMMARY

Embodiments of the present disclosure provide a solution for disk management.

In a first aspect of the present disclosure, there is provided a method of managing disks. The method includes: determining a current usage parameter associated with each of a plurality of disk sets, the current usage parameter indicating usage associated with a capability of each of the plurality of disk sets, and the capability including at least one of the following: a number of permitted accesses per time unit and a number of permitted writes per time unit; imbalance degree associated with the plurality of disk sets, the first imbalance degree indicating a difference in the current usage parameters of the plurality of disk sets; and causing data in at least one disk slice of a first disk set to be moved to a second disk set of the plurality of disk sets, so as to lower down the first imbalance degree.

In a second aspect of the present disclosure, there is provided a device for managing disks. The device includes: at least one processing unit; and at least one memory being coupled to the at least one processing unit and storing instructions for execution by the at least one processing unit, the instructions, when executed by the at least one processing unit, causing the device to perform acts including: determining a current usage parameter associated with each of a plurality of disk sets, the current usage parameter indicating usage associated with a capability of each of the plurality of disk sets, and the capability including at least one of the following: a number of permitted accesses per time unit and a number of permitted writes per time unit; imbalance degree associated with the plurality of disk sets, the first imbalance degree indicating a difference in the current usage parameters of the plurality of disk sets; and causing data in at least one disk slice of a first disk set to be moved to a second disk set of the plurality of disk sets, so as to lower down the first imbalance degree.

In accordance with the third aspect of the present disclosure, there is provided a computer program product stored in a non-transitory computer storage medium and including machine-executable instructions which, when executed by a device, cause the device to perform an action according to any steps of method in the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in example embodiments of the present disclosure.

Throughout the drawings, the same or similar reference symbols refer to the same or similar elements.

DETAILED DESCRIPTION OF EMBODIMENTS

Figure 1:
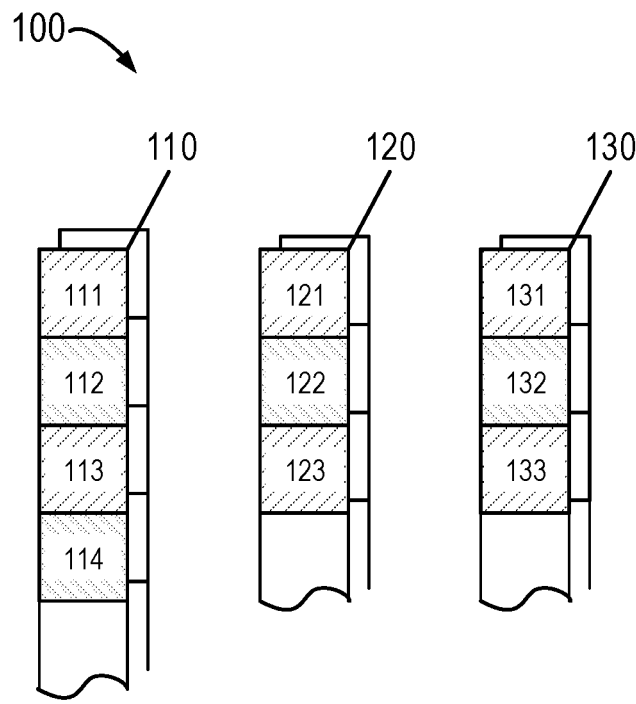
FIG. 1 illustrates a schematic diagram of an environment for disk management according to embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others may denote different or identical objects. The following text may also contain other explicit or implicit definitions.

Hereinafter, the principles of the present disclosure will be described with reference to several example embodiments as shown in the drawings. Although preferred embodiments of the present disclosure are illustrated in the drawings, it would be appreciated that those embodiments are provided to enable those skilled in the art to better understand and further implement the present disclosure, rather than limiting the scope of the present disclosure in any manner.

Most data begin their long life cycles since generated. With the progress in the life cycles, the data will be changed in capability characteristics, such as access frequency and the like. For example, the data are usually utilized frequently since created, i.e., there is a relatively great number of reads and writes per time unit. The number of accesses to the data is decreasing over time. The Fully Automated Storage Tiering for Virtual Pools (FAST VP) technology can dynamically match the storage need and the change of access frequency of data. For example, data having high access frequency are stored in a flash drive at an extreme performance layer. When the access frequency of the data drops to an intermediate level, the data may be moved to a Serial Attached Small Computer System Interface (SCSI (SAS)) drive at a performance layer. In addition, when the access frequency of the data is further reduced, the data may be moved to a Near Line SAS (NL-SAS) drive at a capacity layer. The traditional FAST VP technology neglects a performance difference among disks, for example, in terms of heat, worn-out level or the like, in a data movement process, causing a still big performance difference among disks after movement.

The present disclosure provides a solution for managing disks. In the solution, a current usage parameter associated with each of a plurality of disk sets is determined first, where the current usage parameter indicates usage associated with a capability of each of a plurality of disk sets, and the capability includes at least one of a number of permitted accesses per time unit and a number of permitted writes per time unit. Subsequently, when the current usage parameter can be used to determine a first imbalance degree associated with the plurality of disk sets, where the first imbalance degree indicates a difference in the current usage parameters of the plurality of disk sets. In addition, data in at least one disk slice of the first disk set in the plurality of disk sets can be moved to a second disk set in the plurality of disk sets, so as to lower down the first imbalance degree. In this way, the embodiments of the present disclosure can take into full consideration the difference of the plurality of disk sets in heat, worn-out level or the like when balancing the plurality of disk sets, such that a better balance can be achieved among the performances of the plurality of adjusted disk sets.

FIG. 1 illustrates a schematic diagram of an environment 100 for disk management according to embodiments of the present disclosure. As shown in FIG. 1, the environment 100 may include a plurality of disk sets 110, 120 and 130 for storing data. In some embodiments, the plurality of disk sets 110, 120 and 130, for example, may be used to store different types of data, respectively.

In some embodiments, the plurality of disk sets 110, 120 and 130, for example, are organized in different storage forms. For example, the plurality of disk sets 110, 120 and 130 may be organized as a Redundant Array of Independent Disks (RAID), respectively. As shown in FIG. 1, in the RAID-based example, the plurality of disk sets 110, 120 and 130, for example, may be divided into a plurality of storage blocks. These storage blocks may also be referred to as a plurality of disk extents or a plurality of disk slices. As shown therein, a disk set 110 may include at least disk slices 111, 112, 113 and 114; a disk set 120 may include at least disk slices 121, 122 and 123; and a disk set 130 may include at least disks 131, 132 and 133. It would be appreciated that the storage disk division manner may be a logical division, and the size of each disk slice may be determined by the size of the storage disk and the division manner. In some examples, a size of a disk slice may be of a gigabyte level. Of course, other disk slice size is also feasible according to the actual deployment needs.

According to embodiments of the present disclosure, a storage system (not shown) for managing a plurality of disk sets 110, 120 and 130 may obtain current usage parameters associated with the plurality of storage disks. The storage system may further determine, based on the current usage parameters, an imbalance degree associated with the plurality of disk sets, and may adjust, based on the imbalance degree, a distribution of data in at least one disk slice in the plurality of disk sets, so as to reduce the imbalance degree. The process of adjusting data in a plurality of disk sets will be described below.

Figure 2:
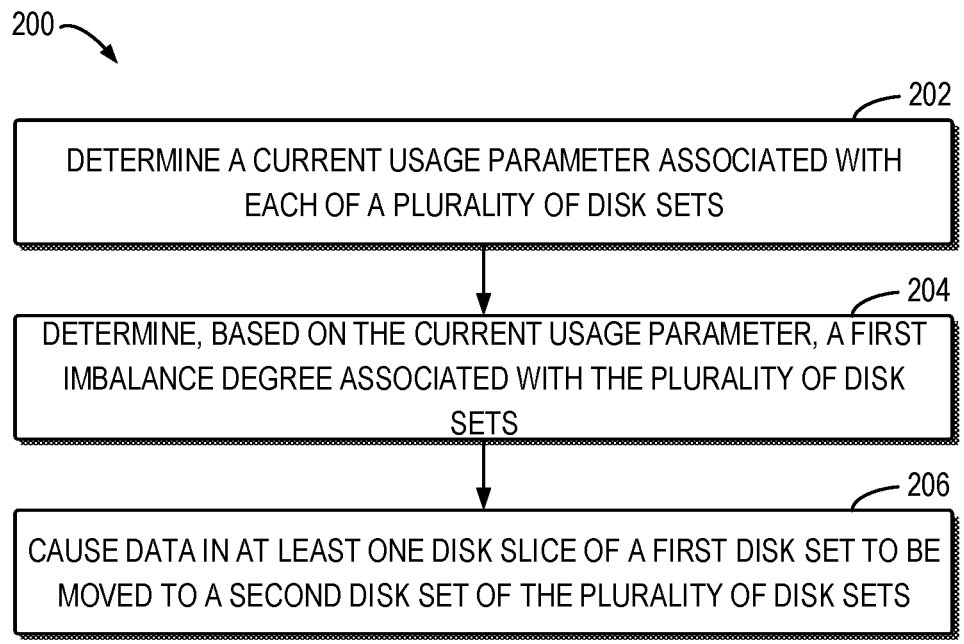
FIG. 2 illustrates a flowchart of a process of disk management according to embodiments of the present disclosure.

FIG. 2 illustrates a flowchart of a process 200 of disk management according to embodiments of the present disclosure. Reference will now be made to FIG. 1 to describe the process 200 of disk management according to embodiments of the present disclosure. The process 200 as shown in FIG. 2, for example, may be performed by the storage system for managing a plurality of disk sets as shown in FIG. 1, or may be performed by other appropriate device. For ease of understanding, specific data as mentioned hereinafter are provided only as an example, without any intention to limit the protection scope of the present disclosure.

At block 202, the storage system determines a current usage parameter associated with each of the plurality of disk sets, where the current usage parameter indicates usage associated with a capability of each disk set which includes at least one of a number of permitted accesses per time unit and a number of permitted writes per time unit.

In some embodiments, the storage system may determine a current usage parameter associated with each disk set by determining an upper limit of the capability of each disk set and a used amount of the capability. Hereinafter, the detailed process at block 202 will be described with reference to FIG. 3, which illustrates a flowchart of a process of determining a current usage parameter according to the embodiments of the present disclosure.

Figure 3:
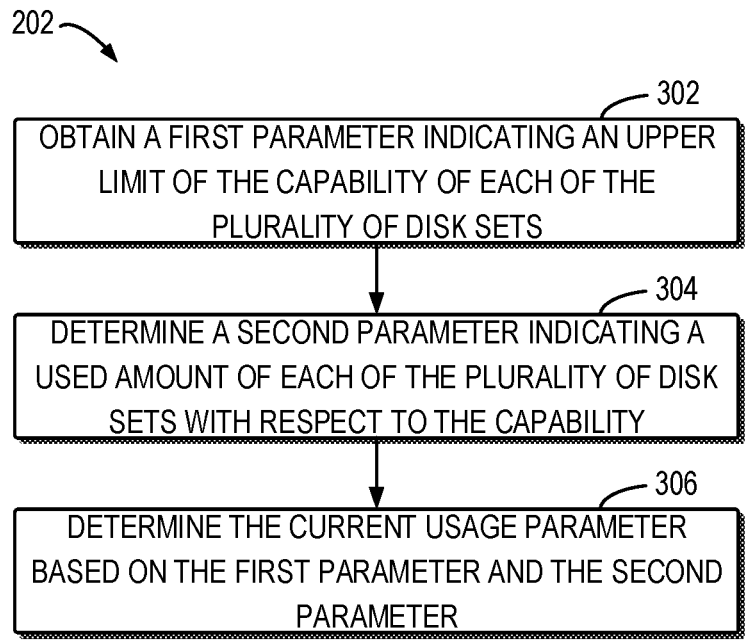
FIG. 3 illustrates a schematic diagram of a process of determining a current usage parameter according to embodiments of the present disclosure.

As shown in FIG. 3, at block 302, the storage system may obtain a first parameter indicating an upper limit of a capacity of each of the plurality of disk sets. In some embodiments, the capability, for example, may include a number of permitted accesses to each of a plurality of disk sets per time unit, an upper limit of which may be determined by a maximum access bandwidth designed for the disk set.

In some examples in which the capability includes a number of permitted writes to each of the plurality of disk sets per time unit, the upper limit of the permitted writes to each of the plurality of disk sets per time unit, for example, is determined by a remaining number of permitted writes to the disk set and an expected use time. For example, by determining a total number of permitted writes and a count of historical writes to each of the plurality of disk sets, the storage system may determine a remaining number of permitted writes of the disk set. In addition, the storage system may determine the expected remaining usage time of the disk set. For example, the storage system may determine the remaining usage time based on a difference of the service life and the used time of the concerned disk set. As a result, the storage system can determine an upper limit of the number of permitted writes per time unit based on the remaining number of permitted writes and the remaining usage time.

At block 304, the storage system may determine a second parameter indicating a used amount about the capability of each of the plurality of disk sets. In some embodiments, if the capability includes a number of permitted writes per time unit, the storage system may obtain a current number of accesses to each of the plurality of disk set per time unit, or determine a predicted number of accesses to each of the plurality of disk set per time unit. Likewise, in the example where the capability includes a number of permitted writes per time unit, the storage system may obtain a current number of accesses to each of the plurality of disk sets per time unit, or determine a number of writes to each of the plurality of disk set per time unit in the future.

At block 306, the storage system may determine the current usage parameter based on the first parameter and the second parameter. More specifically, the storage system, for example, may determine the current usage parameter using a ratio of the second parameter to the first parameter.

In the example where the capability includes a number of permitted accesses per time unit, the ratio may indicate whether each disk set is currently overheated. If the ratio is high (for example, close to 1), it indicates that the current number of accesses to the disk set per time unit is almost close to the upper limit, i.e., the disk set is overheated. In contract, if the ratio is low (for example, close to 0), it indicates that the heat of the disk set is relatively low.

In the example where the capability includes a number of permitted writes per time unit, the ratio, for example, may indicate whether each disk set is currently worn too fast. If the ratio is high, it indicates that the current writes bring too much wear to the disk set. In contrast, if the ratio is low, it indicates that the current writes wear the disk set slowly.

In some embodiments, the current usage parameter may indicate both the heat and the worn-out level. More specifically, the storage system may determine a final current usage parameter by performing weighted summation on the ratio associated with the number of permitted accesses per time unit and the ratio associated with the number of permitted writes per time unit. In this way, the embodiments of the present disclosure can obtain information indicative of a heat and a worn-out level of each disk set.

In some embodiments, the capability of each disk set taken into consideration of the system storage may also include a capacity of each disk set. In some embodiments, the capacity may represent a number of disk slices which can be held in each disk set, which may, for example, be determined by a size of each disk set and a size of a disk slice. For example, if a disk set has a size of 400 GB and each disk slice has a size of 1 GB, the upper limit of the capacity of the disk set may be represented as 400 disk slices.

More specifically, the storage system may determine a first current usage parameter of each of the plurality of disk sets associated with at least one of a number of permitted accesses per time unit and a second current usage parameter associated with a number of permitted writes per time unit, and a second usage parameter of each of the plurality of disk sets associated with the capacity. For capacity, the storage system may determine, based on a size of a disk set, an upper limit of the capacity of the disk set, and may determine, based on a number of occupied disk slices, a used capacity of the disk set, so as to determine the second current usage parameter associated with the capacity. For example, if an upper capacity limit of a disk set is 400 disk slices, 200 disk slices from which have been used, the second current usage parameter, for example, may be represented as 200/400.

Then, the storage system may determine, based on a weighted sum of the first current usage parameter and the second current usage parameter, the current usage parameter associated with each disk set in a plurality of disk sets. In some embodiments, the storage system may take into account all of the number of permitted writes per time unit, the number of permitted accesses per time unit and the capacity of each disk set. At this time, the current usage parameter, for example, may be represented as:

$$V = \omega_1 \cdot W + \omega_2 \cdot T + \omega_3 \cdot C \tag{1}$$

In the formula (1), V represents a current usage parameter, W represents a proportion associated with a number of permitted writes per time unit (which reflects a worn-out level), $\omega_1$ represents a weighting factor associated with the worn-out level, T represents a proportion associated with a number of permitted accesses per time unit (which reflects a heat), $\omega_2$ represents a weighting factor associated with the heat, C represents a proportion associated with a capacity (which reflects capacity usage), and $\omega_3$ represents a weighting factor associated with capacity usage.

In some embodiments, $\omega_1$, $\omega_2$ and $\omega_3$ may be set correspondingly according to the actual needs. For example, out of balance consideration, $\omega_1$, $\omega_2$ and $\omega_3$ may be set equally as ⅓. In a further embodiment in which more emphasis are put on a balance between the heat and the worn-out level, $\omega_1$ and $\omega_2$ may be set to higher values (e.g., 0.4) while $\omega_3$ may be set to a lower value (e.g., 0.2). It would be appreciated that the above weighting factors may be set according to the actual balance need, and the specific numerical values as mentioned above are provided merely illustratively, without any intention to limit the present disclosure.

Continuing to refer to FIG. 2, at block 204, the storage system determines, based on the current usage parameter, a first imbalance degree associated with the plurality of disk sets, where the first imbalance degree indicates a difference in the current usage parameters of the plurality of disk sets. It would be appreciated that, in order to achieve a balance in performances of the respective disk sets in the storage system, it is expected that the respective disk sets are similar in capacity usage ratio, heat and worn-out level, but there is still a big difference among performances of different disk sets in the actual process. The embodiments of the present disclosure can quantize the difference based on the current usage parameter determine above, to provide a basis for balancing a plurality of disk sets.

Figure 4:
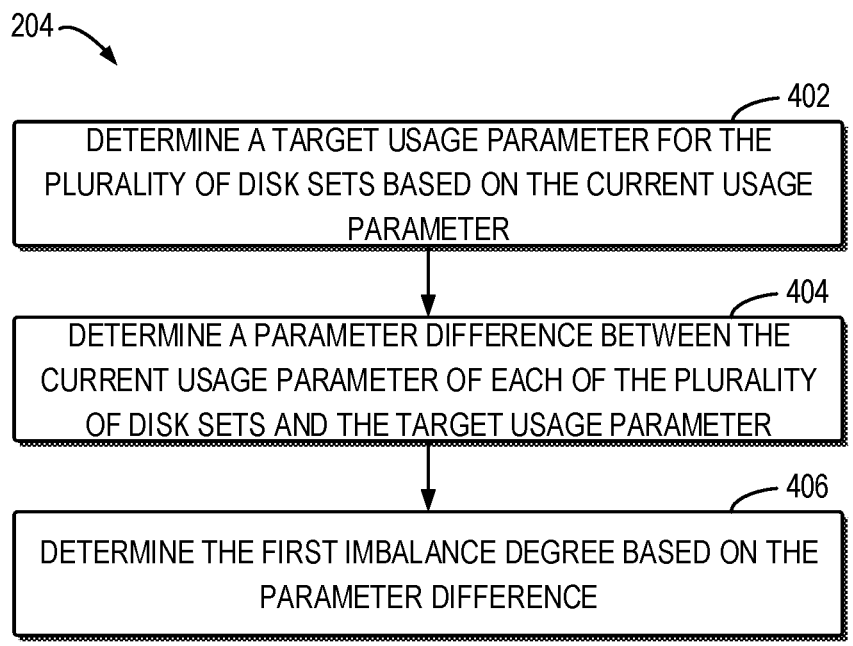
FIG. 4 illustrates a flowchart of a process of determining a first imbalance degree according to embodiments of the present disclosure.

The specific process at block 204 will be described below with reference to FIG. 4 which illustrates a flowchart of a process of determining a first imbalance degree according to embodiments of the present disclosure. As shown in FIG. 4, at block 402, the storage system may determine, based on the current usage parameter, a target usage parameter for a plurality of disk sets. In some embodiments, the target usage parameter may indicate an average usage level of the plurality of disk sets.

Figure 5:
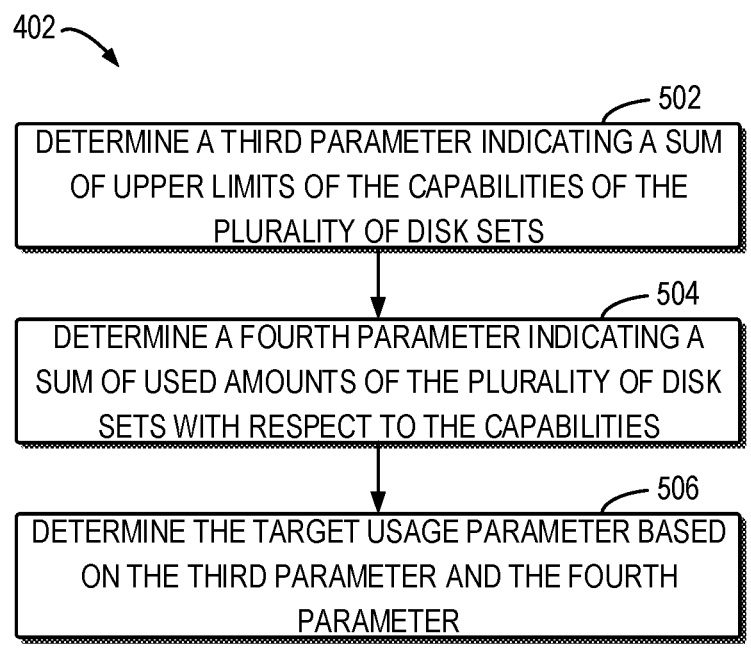
FIG. 5 illustrates a flowchart of a process of determining a target usage parameter according to some embodiments of the present disclosure.

The specific process at block 402 will be described below with reference to FIG. 5 which illustrates a flowchart of a process of determining a target usage parameter according to some embodiments of the present disclosure. As shown in FIG. 5, at block 502, the storage system may determine a third parameter indicating a sum of upper limits of the capacities of a plurality of disk sets. In some embodiments, the storage system, for example, may obtain, based on the value of the denominator of the current usage parameter of each disk set, the upper limit of the capacity of each disk set, and may compute a sum thereof. Taking a number of permitted accesses per time unit as an example, the storage system may use a sum of upper limits of permitted accesses to all disks per time unit as the third parameter.

At block 504, the storage system may determine a fourth parameter indicating a sum of used amounts about the capability of the plurality of disk sets. In some embodiments, the storage system, for example, may obtain, based on the value of the numerator of the current usage parameter of each disk set, the upper limit of the capability of each disk set, and may compute a sum thereof. Taking a number of permitted accesses per time unit as an example, the storage system may use a sum of current permitted accesses to all disks per time unit or a sum of predicted permitted accesses to all disks per time unit as the fourth parameter.

At block 506, the storage system may determine a target usage parameter based on the third parameter and the fourth parameter. More specifically, the storage system may determine the target usage parameter based on a ratio of the fourth parameter to the third parameter. In some embodiments, the storage system may take multiple capabilities into consideration at the same time. For example, in an example where the storage system simultaneously takes into consideration a number of permitted writes per time unit, a number of permitted accesses per time unit and capacity, the storage system may determine the final target usage parameter based on respective ratios corresponding to the three types of capabilities. For example, the target usage parameter may be represented as follows:

$$WM_T = \omega_1 \cdot WM_W + \omega_2 \cdot WM_\tau + \omega_3 \cdot WM_C \quad (2)$$

In the formula (2), $WM_T$ represents a target usage parameter, $WM_W$ represents a proportion associated with a number of permitted writes to a plurality of disk sets per time unit (which reflects an average worn-out level of the plurality of disk sets), $\omega_1$ represents a weighting factor associated with the worn-out level, $WM_T$ represents a proportion associated with a number of permitted accesses to the plurality of disk sets per time unit (which reflects an average heat of the plurality of disk sets), $\omega_2$ represents a weighting factor associated with the heat, $WM_C$ represents a proportion associated with capacities of the plurality of disk sets (which reflects an average capacity usage of the plurality of disk sets), and $\omega_3$ represents a weighting factor associated with the capacity usage. It would be appreciated, in order to ensure computing consistency, the respective weighting factors in the formulae (1) and (2) should be identical.

Continuing to refer to FIG. 4, at block 404, the storage system may determine a parameter difference between the current usage parameter and the target usage parameter of each disk set. More specifically, the storage system may determine a parameter difference based on a difference between the current usage parameter of a disk set and the target usage parameter of the plurality of disk sets. The parameter difference may indicate a difference level between usage of the disk set and average usage of the plurality of disk sets. For example, in the example where the storage system takes into account a number of permitted writes per time unit, a number of permitted accesses per time unit and a capacity, the parameter difference, for example, may be represented as follows:

$$IM = \omega_1 \cdot |WM_W - W| + \omega_2 \cdot |WM_\tau - T| + \omega_3 \cdot |WM_C - C| \quad (3)$$

In the formula (3), IM represents a parameter difference, and for $WM_W$, W, $WM_T$, $WM_C$, C and weighting factors $\omega_1$, $\omega_2$ and $\omega_3$, see the definitions as given in the formulae (1) and (2).

At block 406, the storage system may determine the first imbalance degree based on the parameter difference. In some embodiments, the storage system may determine a variance of the parameter difference associated with each disk set as the first imbalance degree. For example, in the example of FIG. 1, the storage system may determine a variance of respective parameter differences corresponding to the plurality of disk sets 110, 120 and 130 as the first imbalance degree. Alternatively, the storage system, for example, may simply sum the respective parameter differences associated with each disk set as the first imbalance degree. It would be appreciated that, in the example where the storage system takes into account a capacity, a number of permitted accesses per time unit and a number of permitted writes per time unit, the first imbalance degree can reflect a comprehensive imbalance degree among the capacity usage, heat and wear level of different disk sets. In this way, the embodiments of the present disclosure can simultaneously take into account factors related to multiple types of capabilities (e.g., capacity usage, heat and worn-out level), such that a balance can be achieved in usage of multiple capabilities of the plurality of adjusted disk sets.

Continuing to refer to FIG. 2, at block 206, the storage system causes data in at least one disk slice in a first disk set to be moved to a second disk set in the plurality of disk sets, to lower down the first imbalance degree. The specific process at block 206 will be described below with reference to FIG. 6 which illustrates a flowchart of a process of causing data to be moved to the second disk set according to embodiments of the present disclosure.

Figure 6:
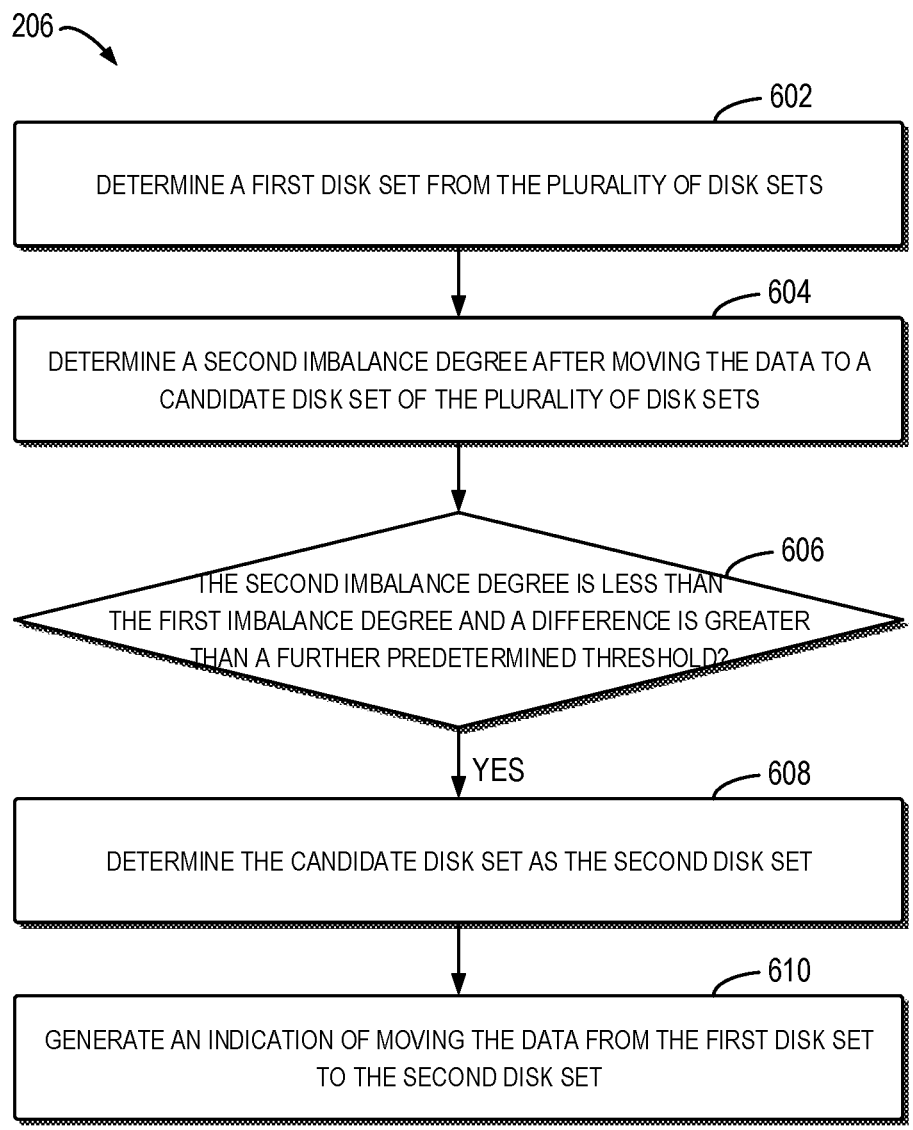
FIG. 6 illustrates a flowchart of a process of moving data to a second disk set according to embodiments of the present disclosure.

As shown in FIG. 6, at block 602, the storage system may determine a first disk set from a plurality of disk sets, where a difference between a current usage parameter of the first disk set and a target usage parameter is greater than a predetermined threshold. In some embodiments, the storage system, for example, may rank the plurality of disk sets according to a difference between a current usage parameter and a target usage parameter of each disk set in the plurality of disk sets, and may, for example, determine a disk set with the biggest difference as the first disk set.

At block 604, the storage system may determine a second imbalance degree after the data are moved to a candidate disk set in the plurality of disk sets. In some embodiments, the storage system may traverse data in all disk slices in the first disk set, to determine sequentially to which disk sets the data should be allocated. More specifically, for the data in the disk slices in the first disk set, the storage system may compute a corresponding second imbalance degree after the data are moved to a candidate disk set in the plurality of disk sets.

In some embodiments, the storage system may determine a normalization parameter for each disk slice. In the example where the storage system simultaneously takes into account the capacity, the number of permitted accesses per time unit and the number of permitted writes per time unit, the capacity normalization parameter of the disk slice, for example, may be represented as $1/\Sigma_{RG}C_{max}$, where $\Sigma_{RG}C_{max}$ represents a sum of upper capacity limits of all disk sets; the normalization parameter of the number of the permitted accesses per time unit may be represented as $T_{slice}/\Sigma_{RG}T_{max}$, where $T_{slice}$ represents a number of permitted accesses to the disk slice per time unit, and $\Sigma_{RG}T_{max}$ represents a sum of upper limits of permitted accesses to all disk sets per time unit; the normalization parameter of the number of permitted accesses per time unit may be represented as $W_r/\Sigma_{RG}Quota$, where $W_r$ represents a number of writes to the disk slice per time unit, and $\Sigma_{RG}Quota$ represents a sum of upper limits of permitted writes to all disk sets per time unit. Based on the normalization parameters determined for a disk slice, the storage system may determine the second imbalance degree after moving the disk slice to a candidate disk set, according to the method as described with reference to block 204.

Taking FIG. 1 as an example, the storage system may normalize parameters related to each disk slice in the plurality of disk sets 110, 120 and 130, and determine, based on the sum of the parameters of each disk slice, parameters for each of the plurality of disk sets (e.g., a used amount of capacity, a number of accesses per time unit and/or a number of writes per time unit). For example, the storage system may determine a disk set 110 as a first disk set. Considering moving the data in the disk slice 111 to a candidate disk set 120, the storage system updates the used amount of capacity, the number of permitted accesses per time unit and/or the number of permitted writes per time unit of the first disk set 110, and updates the normalization parameters of the used amount of capacity, the number of accesses per time unit and/or the number of writes per time unit of the candidate disk set 120 additionally provided with the data in the disk slice 111, thereby updating the first imbalance degree correspondingly.

At block 606, the storage system may determine whether the second imbalance degree is less than the first imbalance degree and whether the difference between the first imbalance degree and the second imbalance degree is greater than a predetermined threshold. In response to determining at block 606 that the second imbalance degree is less than the first imbalance degree and the difference between the first imbalance degree and the second imbalance degree is greater than the predetermined threshold, the process moves to block 608, i.e., the storage system may determine the candidate disk set as the second disk set. Taking FIG. 1 as an example, for the disk slice 111 in the first disk set 110, the storage system may determine, from the plurality of disk sets 110, 120 and 130, a candidate disk set with a minimum imbalance degree after moving the data in the disk slice 111 therein as the second disk set.

At block 610, the storage system may generate an indication of moving the data from the first disk set to the second disk set. In some embodiments, the storage system may move metadata corresponding to data in a disk slice to an intermediate storage which may be a memory list of a temporary storage. The storage system may move the metadata in the intermediate storage to at least a disk in a plurality of disks. For example, a metadata tag in the intermediate storage may be moved to at least a disk in the plurality of disk sets. Only after having tagged all disk slices in the plurality of disk sets, the storage system moves the real data corresponding to the tagged metadata to the second disk set in the plurality of storage disks.

In some embodiments, the process 200 may be performed periodically by the storage system, where the system may compare a first imbalance measure with a predetermined threshold, and if the first imbalance measure is greater than the threshold, the data in the plurality of disk sets are moved from a first disk set to a second disk set. In this way, the storage system can prevent data movement when balancing the performances of the plurality of disk sets, thereby avoiding incurring unnecessary movement overheads.

In view of the above implementations, the embodiments of the present disclosure take into account heat and/or worn-out level of a plurality of disk sets when balancing performances of the plurality of disk sets, thereby avoiding exacerbating imbalance among the plurality of disk sets in terms of heat and/or worn-out level if it is only intended to achieve a balance in capacity. In this way, the embodiments of the present disclosure can achieve a better balance among performances of a plurality of adjusted disk sets.

Figure 7:
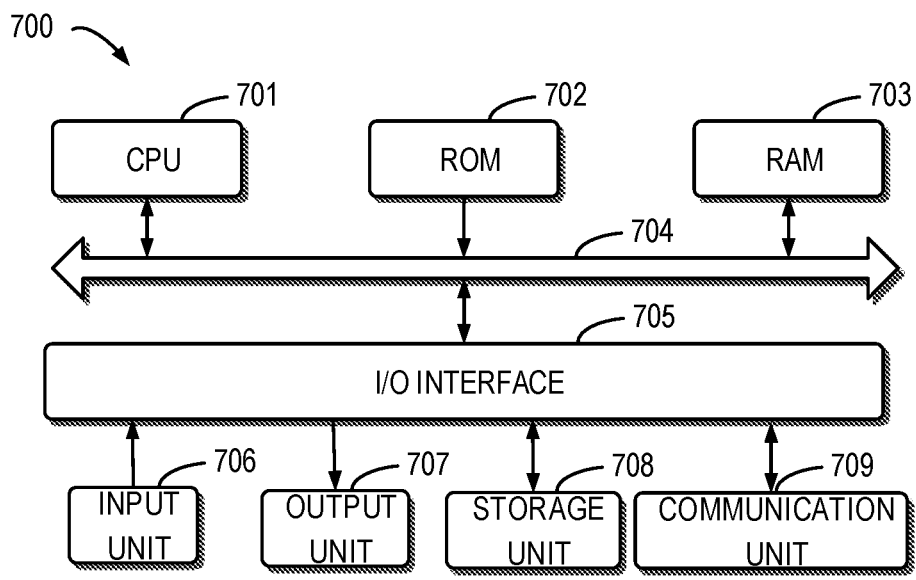
FIG. 7 illustrates a schematic block diagram of an example device adapted to implement embodiments of the present disclosure.

FIG. 7 shows a schematic block diagram of an example device 700 that can be used to implement embodiments of the present disclosure. As shown, device 700 includes a central processing unit (CPU) 701 that can perform various appropriate actions according to computer program instructions stored in read only memory (ROM) 702 or loaded from storage unit 708 into a random access memory (RAM) 703. In the RAM 703, various programs and data required for the operation of the device 700 can also be stored. The CPU 701, the ROM 702, and the RAM 703 are connected to each other through a bus 704. An input/output (I/O) interface 705 is also coupled to bus 704.

A plurality of components in device 700 are coupled to I/O interface 705, including: input unit 706, such as a keyboard, mouse, etc.; output unit 707, such as various types of displays, speakers, etc.; storage unit 708, such as a disk and an optical unit, etc.; and a communication unit 709 such as a network card, a modem, a wireless communication transceiver, and the like. Communication unit 709 allows device 700 to exchange information/data with other devices over a computer network such as the Internet and/or various telecommunication networks.

The various processes and processes described above, such as process 200, may be performed by processing unit 701. For example, in some embodiments, process 200 can be implemented as a computer software program that is tangibly embodied in a machine readable medium, such as storage unit 708. In some embodiments, some or the entire computer program may be loaded and/or installed onto device 700 via ROM 702 and/or communication unit 709. One or more actions of process 200 described above may be performed when a computer program is loaded into RAM 703 and executed by CPU 701.

The present disclosure can be a method, device, system and/or computer product. The computer product can include a computer readable storage medium with computer readable program instructions for performing various aspects of the present disclosure thereon.

A computer readable storage medium may be a tangible device that can hold and store the instructions used by the instruction execution device. The computer readable storage medium can be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory stick, floppy disk, mechanical encoding device, for example, the hole card with instructions stored thereon or raised structure in groove, and any suitable combination of the above. The computer readable storage medium as used herein is not to be interpreted as a transient signal itself, such as a radio wave or other freely propagating electromagnetic wave, an electromagnetic wave propagating through a waveguide or other transfer medium (e.g., a light pulse through a fiber optic cable), or the electrical signal transferred through a wire.

The computer readable program instructions described herein can be downloaded from a computer readable storage medium to various computing/processing devices, or downloaded to an external computer or external storage device over a network, such as the Internet, a local area network, a wide area network, and/or a wireless network. The network may include copper transfer cables, fiber optic transfers, wireless transfers, routers, firewalls, switches, gateway computers, and/or edge servers. A network adapter card or a network interface in each computing/processing device receives computer readable program instructions from the network and forwards the computer readable program instructions for storage in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, such as Smalltalk, C++ and so on, as well as conventional procedural programming languages, such as "C" language or similar programming language. The computer readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

Various aspects of the disclosure are described herein with reference to flowcharts and/or block diagrams of methods, devices (systems) and computer products according to embodiments of the present disclosure. It will be understood that each block of the flowchart illustrations and/or block diagrams, and combinations of blocks in the flowcharts and/or block diagrams can be implemented by computer readable program instructions.

These computer readable program instructions can be provided to a processing unit of a general purpose computer, a special purpose computer or other programmable data processing apparatus to produce a machine such that when the instructions are executed by processing unit via a computer or other programmable data processing apparatus, devices that implement the functions/acts specified in one or more of the flowcharts and/or block diagrams are produced. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more blocks of the flowcharts and/or block diagrams.

Computer readable program instructions can also be loaded onto a computer, other programmable data processing device, or other device to perform a series of operational steps on a computer, other programmable data processing device or other device to produce a process that a computer is implemented such that instructions executed on a computer, other programmable data processing apparatus, or other device implement the functions/acts recited in one or more of the flowcharts and/or block diagrams.

The flowchart and block diagrams in the drawings illustrate the architecture, functionality, and operation of possible implementations of devices, methods, and computer products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, or enable other ordinary technical staffs in the art to understand the embodiments in the disclosure.

We claim:

1. A method of disk management, comprising:

determining a current usage parameter associated with each of a plurality of disk sets, the current usage parameter indicating usage associated with a capability of each of the plurality of disk sets, and the capability comprising at least one of the following: a number of permitted accesses per time unit and a number of permitted writes per time unit;

determining, based on the current usage parameter, a first imbalance degree associated with the plurality of disk sets, the first imbalance degree indicating a difference in the current usage parameters of the plurality of disk sets; and causing data in at least one disk slice of a first disk set to be moved to a second disk set of the plurality of disk sets, so as to lower down the first imbalance degree;

wherein determining the first imbalance degree comprises:

determining a target usage parameter for the plurality of disk sets based on the current usage parameter;

determining a parameter difference between the current usage parameter of each of the plurality of disk sets and the target usage parameter; and determining the first imbalance degree based on the parameter difference.

2. The method of claim 1, wherein determining the current usage parameter comprises:

obtaining a first parameter indicating an upper limit of the capability of each of the plurality of disk sets;

determining a second parameter indicating a used amount of each of the plurality of disk sets with respect to the capability; and determining the current usage parameter based on the first parameter and the second parameter.

3. The method of claim 1, wherein the capability further comprises a capacity, and wherein determining the current usage parameter comprises:

determining a first current usage parameter associated with the at least one of the number of permitted accesses per time unit and the number of permitted writes per time unit of each disk set, and a second current usage parameter associated with the capacity; and determining the current usage parameter associated with each of the plurality of disk sets based on a weighted sum of the first and second current usage parameters.

4. The method of claim 1, wherein determining the target usage parameter for the plurality of disk sets comprises:

determining a third parameter indicating a sum of upper limits of the capabilities of the plurality of disk sets;

determining a fourth parameter indicating a sum of used amounts of the plurality of disk sets with respect to the capabilities; and determining the target usage parameter based on the third parameter and the fourth parameter.

5. The method of claim 1, wherein determining the first imbalance degree based on the parameter difference comprises:

determining a variance of the parameter differences associated with the plurality of disk sets as the first imbalance degree.

6. The method of claim 1, wherein moving the data to the second disk set comprises:

determining a first disk set from the plurality of disk sets, a difference between the current usage parameter of the first disk set and the target usage parameter being greater than a predetermined threshold;

determining a second imbalance degree after moving the data to a candidate disk set of the plurality of disk sets;

in accordance with a determination that the second imbalance degree is less than the first imbalance degree and a difference between the first imbalance degree and the second imbalance degree is greater than a further predetermined threshold, determining the candidate disk set as the second disk set; and generating an indication of moving the data from the first disk set to the second disk set.

7. The method of claim 1, wherein the plurality of disk sets includes different disk set tiers providing different access performance levels.

8. The method of claim 1, wherein the first disk set belongs to one of a flash drive tier and a Serial Attached Small Computer System Interface (SCSI SAS) drive tier; and wherein the second disk set belongs to the other of the flash drive tier and the SCSI SAS drive tier.

9. An electronic device, comprising:

at least one processing unit; and at least one memory being coupled to the at least one processing unit and storing instructions for execution by the at least one processing unit, the instructions, when executed by the at least one processing unit, causing the device to perform acts comprising:

determining a current usage parameter associated with each of a plurality of disk sets, the current usage parameter indicating usage associated with a capability of each of the plurality of disk sets, and the capability comprising at least one of the following: a number of permitted accesses per time unit and a number of permitted writes per time unit;

determining, based on the current usage parameter, a first imbalance degree associated with the plurality of disk sets, the first imbalance degree indicating a difference in the current usage parameters of the plurality of disk sets; and causing data in at least one disk slice of a first disk set to be moved to a second disk set of the plurality of disk sets, so as to lower down the first imbalance degree;

wherein determining the first imbalance degree comprises:

determining a target usage parameter for the plurality of disk sets based on the current usage parameter;

determining a parameter difference between the current usage parameter of each of the plurality of disk sets and the target usage parameter; and determining the first imbalance degree based on the parameter difference.

10. The device of claim 9, wherein determining the current usage parameter comprises:

obtaining a first parameter indicating an upper limit of the capability of each of the plurality of disk sets;

determining a second parameter indicating a used amount of each of the plurality of disk sets with respect to the capability; and determining the current usage parameter based on the first parameter and the second parameter.

11. The device of claim 9, wherein the capability further comprises a capacity, and wherein determining the current usage parameter comprises:
determining a first current usage parameter associated with the at least one of the number of permitted accesses per time unit and the number of permitted writes per time unit of each disk set, and a second current usage parameter associated with the capacity; and
determining the current usage parameter associated with each of the plurality of disk sets based on a weighted sum of the first and second current usage parameters.

12. The device of claim 9, wherein determining the target usage parameter for the plurality of disk sets comprises:
determining a third parameter indicating a sum of upper limits of the capabilities of the plurality of disk sets;
determining a fourth parameter indicating a sum of used amounts of the plurality of disk sets with respect to the capabilities; and
determining the target usage parameter based on the third parameter and the fourth parameter.

13. The device of claim 9, wherein determining the first imbalance degree based on the parameter difference comprises:
determining a variance of the parameter differences associated with the plurality of disk sets as the first imbalance degree.

14. The device of claim 9, wherein moving the data to the second disk set comprises:
determining a first disk set from the plurality of disk sets, a difference between the current usage parameter of the first disk set and the target usage parameter being greater than a predetermined threshold;
determining a second imbalance degree after moving the data to a candidate disk set of the plurality of disk sets;
in accordance with a determination that the second imbalance degree is less than the first imbalance degree and a difference between the first imbalance degree and the second imbalance degree is greater than a further predetermined threshold, determining the candidate disk set as the second disk set; and
generating an indication of moving the data from the first disk set to the second disk set.

15. A computer program product having a non-transitory computer readable medium which stores a set of instructions to perform disk management; the set of instructions, when carried out by computerized circuitry, causing the computerized circuitry to perform a method of:
determining a current usage parameter associated with each of a plurality of disk sets, the current usage parameter indicating usage associated with a capability of each of the plurality of disk sets, and the capability comprising at least one of the following: a number of permitted accesses per time unit and a number of permitted writes per time unit;
determining, based on the current usage parameter, a first imbalance degree associated with the plurality of disk sets, the first imbalance degree indicating a difference in the current usage parameters of the plurality of disk sets; and
causing data in at least one disk slice of a first disk set to be moved to a second disk set of the plurality of disk sets, so as to lower down the first imbalance degree;
wherein determining the first imbalance degree comprises:
determining a target usage parameter for the plurality of disk sets based on the current usage parameter;
determining a parameter difference between the current usage parameter of each of the plurality of disk sets and the target usage parameter; and
determining the first imbalance degree based on the parameter difference.

16. The computer program product of claim 15, wherein determining the current usage parameter comprises:
obtaining a first parameter indicating an upper limit of the capability of each of the plurality of disk sets;
determining a second parameter indicating a used amount of each of the plurality of disk sets with respect to the capability; and
determining the current usage parameter based on the first parameter and the second parameter.

17. The computer program product of claim 15, wherein the capability further comprises a capacity, and wherein determining the current usage parameter comprises:
determining a first current usage parameter associated with the at least one of the number of permitted accesses per time unit and the number of permitted writes per time unit of each disk set, and a second current usage parameter associated with the capacity; and
determining the current usage parameter associated with each of the plurality of disk sets based on a weighted sum of the first and second current usage parameters.

18. The computer program product of claim 15, wherein determining the target usage parameter for the plurality of disk sets comprises:
determining a third parameter indicating a sum of upper limits of the capabilities of the plurality of disk sets;
determining a fourth parameter indicating a sum of used amounts of the plurality of disk sets with respect to the capabilities; and
determining the target usage parameter based on the third parameter and the fourth parameter.

19. The computer program product of claim 15, wherein determining the first imbalance degree based on the parameter difference comprises:
determining a variance of the parameter differences associated with the plurality of disk sets as the first imbalance degree.

20. The computer program product of claim 15, wherein moving the data to the second disk set comprises:
determining a first disk set from the plurality of disk sets, a difference between the current usage parameter of the first disk set and the target usage parameter being greater than a predetermined threshold;
determining a second imbalance degree after moving the data to a candidate disk set of the plurality of disk sets;
in accordance with a determination that the second imbalance degree is less than the first imbalance degree and a difference between the first imbalance degree and the second imbalance degree is greater than a further predetermined threshold, determining the candidate disk set as the second disk set; and
generating an indication of moving the data from the first disk set to the second disk set.

* * * * *